(12) United States Patent
Wippermann et al.

(10) Patent No.: US 11,290,649 B2
(45) Date of Patent: *Mar. 29, 2022

(54) MULTI-APERTURE IMAGING DEVICE COMPRISING AN OPTICAL SUBSTRATE

(71) Applicant: Fraunhofer-Gesellschaft zur Förderung der angewandten Forschung e.V., Munich (DE)

(72) Inventors: Frank Wippermann, Meiningen (DE); Andreas Brückner, Jena (DE); Andreas Bräuer, Schlöben (DE); Alexander Oberdörster, Jena (DE)

(73) Assignee: Fraunhofer-Gesellschaft zur Förderung der angewandten Forschung e.V.

( * ) Notice: Subject to any disclaimer, the term of this patent is extended or adjusted under 35 U.S.C. 154(b) by 0 days.

This patent is subject to a terminal disclaimer.

(21) Appl. No.: 16/825,785

(22) Filed: Mar. 20, 2020

(65) Prior Publication Data

US 2020/0221032 A1    Jul. 9, 2020

Related U.S. Application Data

(63) Continuation of application No. 15/898,370, filed on Feb. 16, 2018, now Pat. No. 10,630,902, which is a (Continued)

(30) Foreign Application Priority Data

Aug. 19, 2015    (DE) ..................... 10 2015 215 833.0

(51) Int. Cl.
*H04N 5/232*    (2006.01)
*H04N 5/225*    (2006.01)
(Continued)

(52) U.S. Cl.
CPC ......... *H04N 5/23287* (2013.01); *G02B 7/021* (2013.01); *G02B 13/001* (2013.01);
(Continued)

(58) Field of Classification Search
CPC ............. H04N 5/23287; H04N 5/2259; H04N 5/2258; H04N 5/2254; G02B 17/002;
(Continued)

(56) References Cited

U.S. PATENT DOCUMENTS 4,402,572 A    9/1983    Tsunoda et al.
8,385,013 B2   2/2013    Hishinuma
(Continued)

FOREIGN PATENT DOCUMENTS

CN    103890949 A    6/2014
CN    104350732 A    2/2015
(Continued)

OTHER PUBLICATIONS

Office Action dated Jun. 19, 2019 issued in the parallel Japanese patent application No. 2018-509602 (5 pages).
(Continued)

*Primary Examiner* — Abdelaaziz Tissire
(74) *Attorney, Agent, or Firm* — Haynes and Boone, LLP

(57) ABSTRACT

In order to achieve a relatively small installation height of a multi-aperture imaging device having a one-line array of adjacently arranged optical channels, lenses of the optics of the optical channels are attached to a main side of a substrate by one or more lens holders and are mechanically connected via the substrate, the substrate being positioned such that the optical paths of the plurality of optical channels pass therethrough.

22 Claims, 12 Drawing Sheets

Related U.S. Application Data continuation of application No. PCT/EP2016/069641, filed on Aug. 18, 2016.

(51) Int. Cl.

| | | |
|---|---|---|
| *G02B 17/00* | (2006.01) | |
| *G02B 7/02* | (2021.01) | |
| *G02B 26/08* | (2006.01) | |
| *G02B 13/00* | (2006.01) | |
| *G02B 27/10* | (2006.01) | |
| *G02B 27/64* | (2006.01) | |
| *G02B 1/04* | (2006.01) | |

(52) U.S. Cl.
CPC ....... *G02B 13/0065* (2013.01); *G02B 17/002* (2013.01); *G02B 26/0816* (2013.01); *G02B 27/1066* (2013.01); *G02B 27/646* (2013.01); *H04N 5/2254* (2013.01); *H04N 5/2258* (2013.01); *H04N 5/2259* (2013.01); *H04N 5/232* (2013.01); *G02B 1/041* (2013.01)

(58) Field of Classification Search
CPC .... G02B 27/646; G02B 7/021; G02B 13/001; G02B 27/1066; G02B 26/0816; G02B 13/0065; G02B 1/041
See application file for complete search history.

(56) References Cited

U.S. PATENT DOCUMENTS

| | | | |
|---|---|---|---|
| 9,083,873 B1 | 7/2015 | Lewkow | |
| 10,630,902 B2 * | 4/2020 | Wippermann | G02B 17/002 |
| 2002/0097476 A1 | 7/2002 | Ishikawa et al. | |
| 2004/0042739 A1 | 3/2004 | Maeno | |
| 2005/0007481 A1 | 1/2005 | Yamaguchi et al. | |
| 2006/0018029 A1 * | 1/2006 | Vigier-Blanc | H01L 31/0232 |
| | | | 359/642 |
| 2006/0285003 A1 * | 12/2006 | Chang | H04N 5/2254 |
| | | | 348/335 |
| 2008/0112029 A1 | 5/2008 | Bodkin | |
| 2010/0165134 A1 | 7/2010 | Dowski, Jr. et al. | |
| 2010/0328471 A1 | 12/2010 | Boland et al. | |
| 2011/0141342 A1 * | 6/2011 | Ming | G03B 3/00 |
| | | | 348/345 |
| 2011/0141585 A1 | 6/2011 | Kuo | |
| 2015/0109468 A1 | 4/2015 | Laroia | |
| 2016/0154202 A1 | 6/2016 | Wippermann et al. | |
| 2016/0187611 A1 | 6/2016 | Wippermann et al. | |
| 2017/0012069 A1 * | 1/2017 | Rudmann | H04N 5/2251 |
| 2017/0059808 A1 | 3/2017 | Wippermann et al. | |
| 2017/0118388 A1 | 4/2017 | Wippermann et al. | |

FOREIGN PATENT DOCUMENTS

| | | |
|---|---|---|
| DE | 3026170 A1 | 2/1981 |
| DE | 102011081408 A1 | 2/2013 |
| DE | 102013209819 A1 | 11/2014 |
| DE | 102013209823 A1 | 11/2014 |
| DE | 102013209829 A1 | 11/2014 |
| DE | 102014213371 B3 | 8/2015 |
| JP | S55127674 A | 10/1980 |
| JP | 2004-85873 A | 3/2004 |
| JP | 2008249782 A | 10/2008 |
| JP | 2009027311 A | 2/2009 |
| JP | 2009-533885 A | 9/2009 |
| JP | 2010124164 A | 6/2010 |
| TW | 200510765 A | 3/2005 |
| TW | 201533491 A | 9/2015 |
| WO | WO 2013/026825 A1 | 2/2013 |
| WO | WO 2014/198473 A | 12/2014 |
| WO | WO 2015/019772 A1 | 2/2015 |

OTHER PUBLICATIONS

Office Action dated Aug. 22, 2018 issued in the parallel Taiwan patent application No. 105126363 (7 pages with English translation).

Office Action dated Dec. 19, 2019 in the parallel Chinese patent application No. 201680060964.2 (21 pages).

Office Action dated Apr. 27, 2020 issued in the parallel IN patent application No. 201837005179 (5 pages).

* cited by examiner

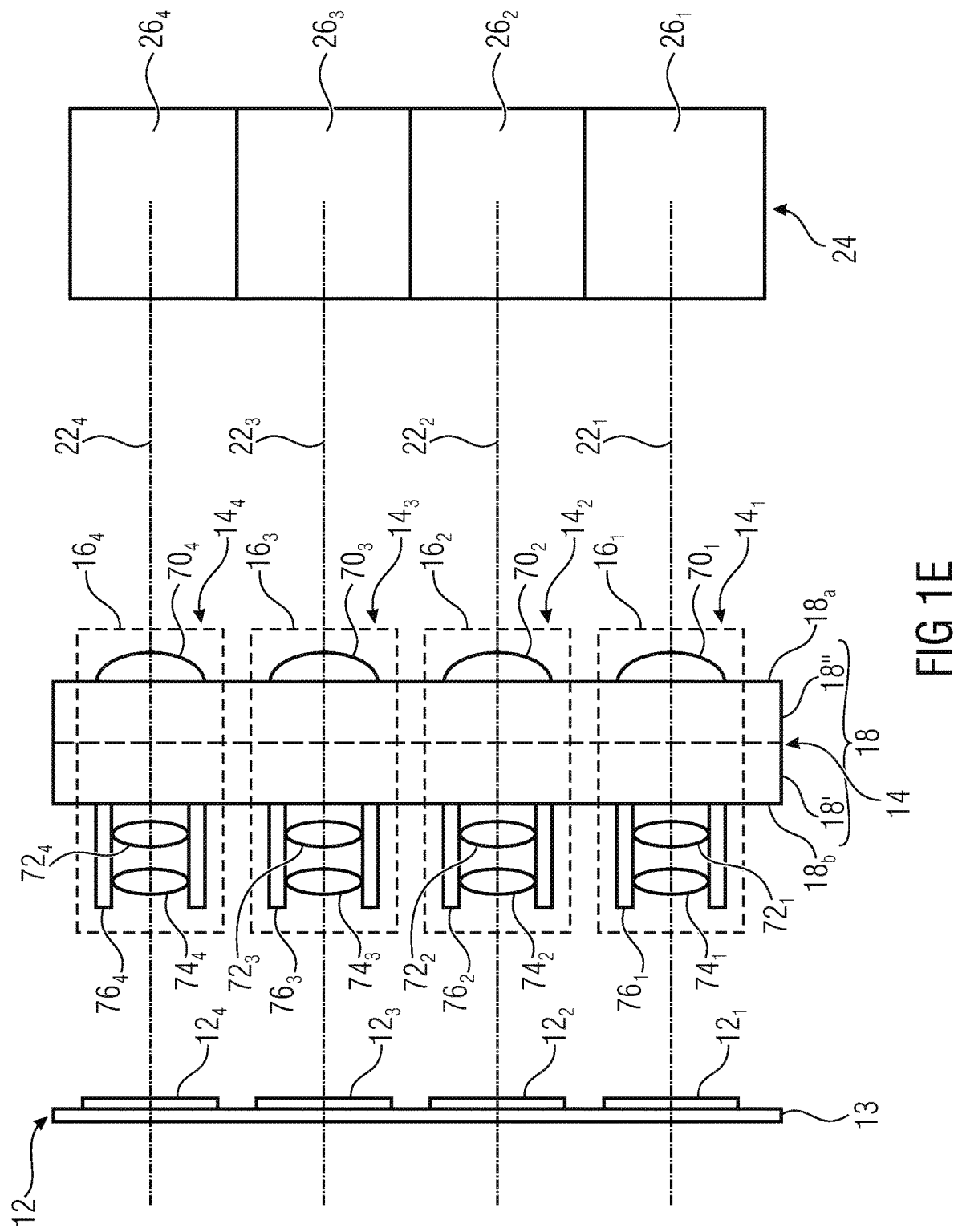

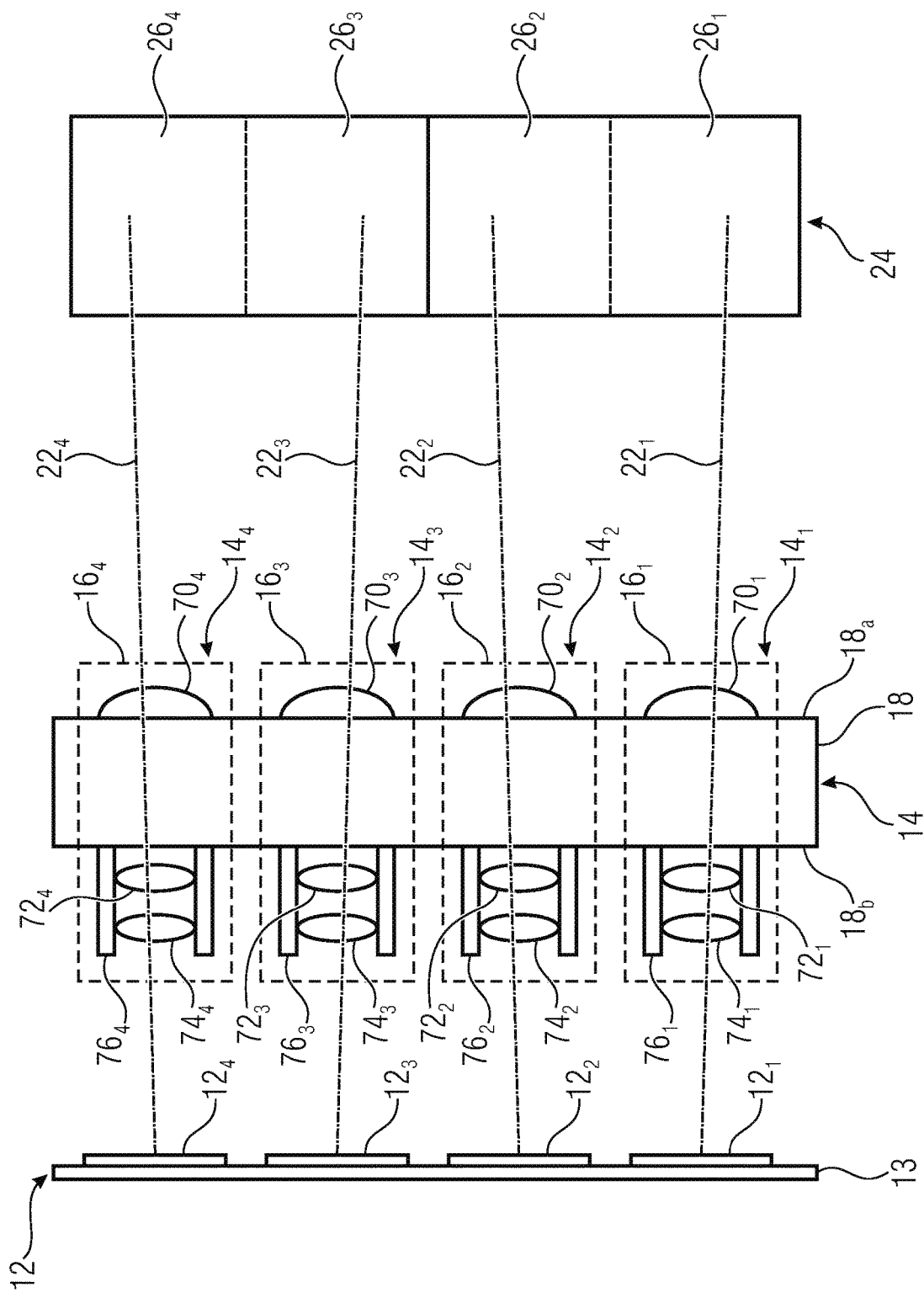

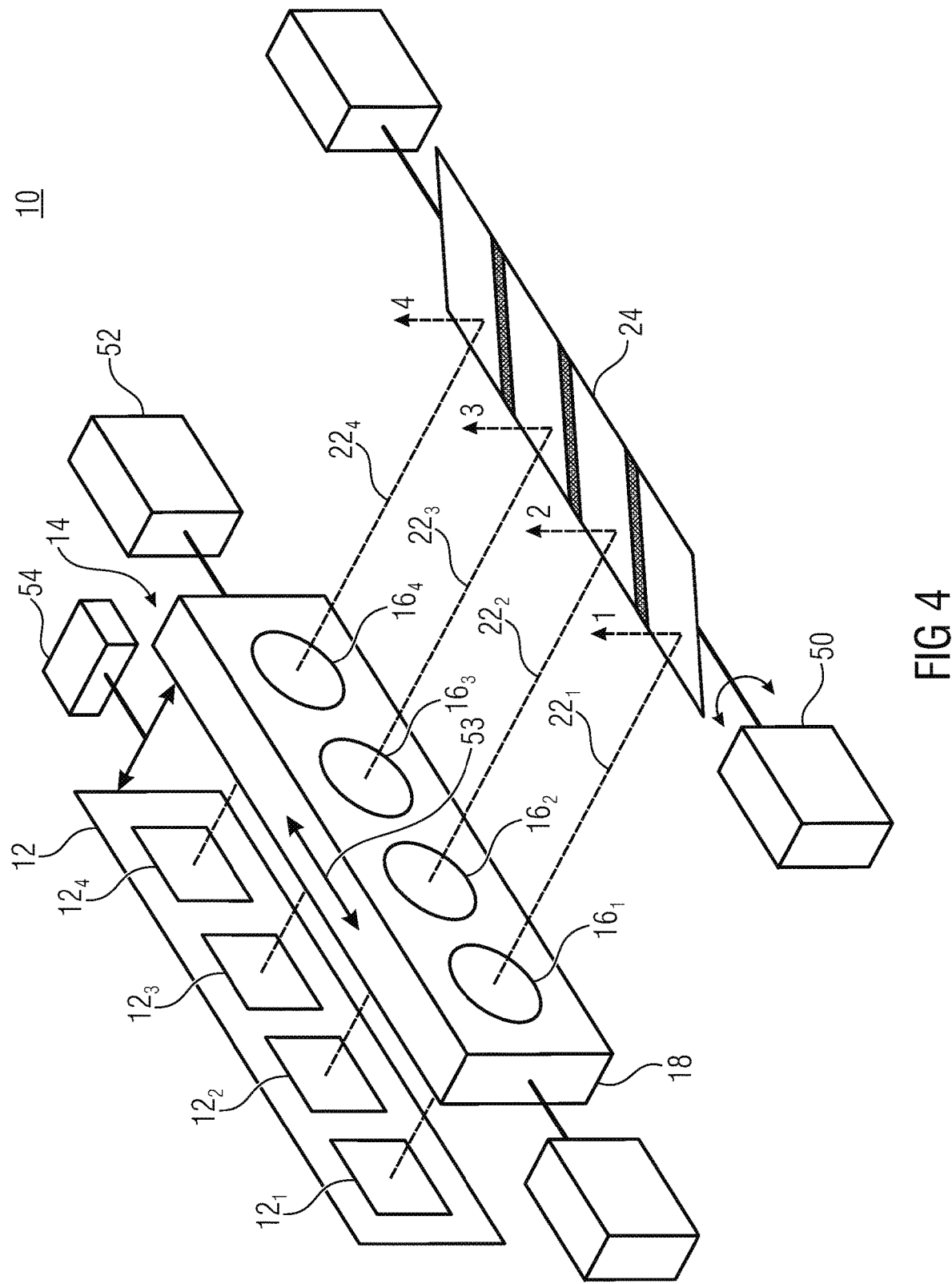

MULTI-APERTURE IMAGING DEVICE COMPRISING AN OPTICAL SUBSTRATE

CROSS-REFERENCES TO RELATED APPLICATION

This application is a continuation of co-pending U.S. patent application Ser. No. 15/898,370 filed Feb. 16, 2018 which is a continuation of International Application No. PCT/EP2016/069641, filed Aug. 18, 2016, both of which are incorporated herein by reference in their entirety, and additionally claims priority from German Application No. DE 10 2015 215 833.0, filed Aug. 19, 2015, which is incorporated herein by reference in its entirety.

BACKGROUND OF THE INVENTION

The present invention relates to a multi-aperture imaging device comprising a one-line array of adjacently arranged optical channels.

Multi-aperture imaging devices having a linear channel arrangement are used mostly when as small an installation height as possible is important. The minimally achievable installation height of a multi-aperture imaging device having a linear channel arrangement is mostly predefined by the lens diameters. The installation height is not to exceed the lens diameter if possible. However, if individual lenses connected in series are used for the optic of each channel, which lenses may be produced, for example, by polymer injection molding and/or glass embossing, housing structures will be used in order to fix the lenses of the optics in place. Such housing structures will then also be located above and below the lenses, whereby the above mentioned installation height is increased.

SUMMARY

According to an embodiment, a multi-aperture imaging device may have: a one-line array of adjacently arranged optical channels, each channel including an optic for projecting a respective partial field of view of a total field of view of the multi-aperture imaging device on a respectively associated image sensor region of an image sensor; wherein lenses of the optics of the optical channels are held within openings of one or more lens holders and the one or more lens holders are attached to a substrate of the array so that the lenses are mechanically connected via the substrate and that lens vertices of the lenses are spaced apart from the substrate, the lenses being held in a constant relative location with respect to each other via the substrate, the substrate being configured to be transparent, and optical paths of the plurality of optical channels passing through the substrate; a beam-deflecting device for deflecting an optical path of the optical channels; wherein the substrate is configured to be plate-shaped; and wherein the one or more lens holders are mounted on the main side of the substrate.

According to another embodiment, a multi-aperture imaging device may have: a one-line array of adjacently arranged optical channels, each channel including an optic; wherein lenses of the optics of the optical channels are held within openings of one or more lens holders and the one or more lens holders are attached to a substrate so that the lenses are mechanically connected via the substrate and that lens vertices of the lenses are spaced apart from the substrate, the substrate being configured to be transparent, and optical paths of the plurality of optical channels passing through the substrate; wherein the multi-aperture imaging device further comprises an actuator for translationally moving the substrate along a line extension direction of the one-line array; wherein the actuator is controlled by an optical image stabilization controller of the multi-aperture imaging device; and wherein the multi-aperture imaging device further comprises a beam-deflecting device for deflecting an optical path of the optical channels and a further actuator for producing a rotational movement of the beam-deflecting device, which actuator is further controlled by the optical image stabilization controller of the multi-aperture imaging device such that the translational movement of the substrate causes image stabilization along a first image axis and such that the generation of the rotational movement of the beam-deflecting device causes image stabilization along a second image axis.

The finding of the present invention consists in that a relatively small installation height of a multi-aperture imaging device having a one-line array of adjacently arranged optical channels may be achieved in that lenses of the optics of the optical channels are attached to a main side by one or more lens holders ($76_1$, $76_2$, $76_3$, $76_4$) and are mechanically connected via the substrate, i.e., are mutually fixed in place, and in that the substrate is positioned such that the optical paths of the plurality of optical channels pass therethrough. The substrate may readily be configured to be transparent and will thus not interfere with the optical paths. On the other hand, placing the substrates in the optical paths avoids an increase in the installation height. Moreover, the substrate may be formed of a material which as compared to the optics themselves comprises smaller expansion coefficient, increased hardness, a higher modulus of elasticity and/or rigidity and material characteristics which generally deviate from those of the lens materials. In this manner it is possible to select the material for the lenses on the main side of the substrate by criteria which enable sufficient optical quality at low cost, and to select the material of the substrate by criteria according to which, e.g., the location of the lenses of the optics remains as constant as possible across temperature fluctuations. For example, the lenses attached to the substrate by the lens holders may be individually manufactured by injection molding and thus comprise a high optical quality at low cost and, consequently, little shape deviation from the target shape with, e.g., a large refractive power, a large rising height, a steep flank angle and, consequently, a small f-number. Low-cost implementations might also provide for the substrate to additionally comprise lenses formed on a main side facing away from the first-mentioned main side: said lenses might be integral with the substrate or be produced by molding such as by means of UV replication, for example.

BRIEF DESCRIPTION OF THE DRAWINGS

Embodiments of the present invention will be detailed subsequently referring to the appended drawings, in which:

FIG. 1E shows a top view of a multi-aperture imaging device in accordance with a variant wherein the carrier substrate is composed of two partial substrates in a direction transverse to the optical paths;

FIGS. 1F and 1G show a sectional side view and a top view of a multi-aperture imaging device in accordance with a variant of FIGS. 1C and 1B, wherein the optical axes of the channels comprise a pre-divergence so as to divergently extend in parallel with the line extension direction within a shared plane, so that the number of facets having inclinations that differ in a pair-by-pair manner may be reduced;

FIG. 4 shows a schematic perspective view of a multi-aperture imaging device in accordance with an embodiment, wherein means for changing the location between the image sensor, the one-line array of optical channels and the beam-deflecting device are present;

DETAILED DESCRIPTION OF THE INVENTION

Figure 1A:
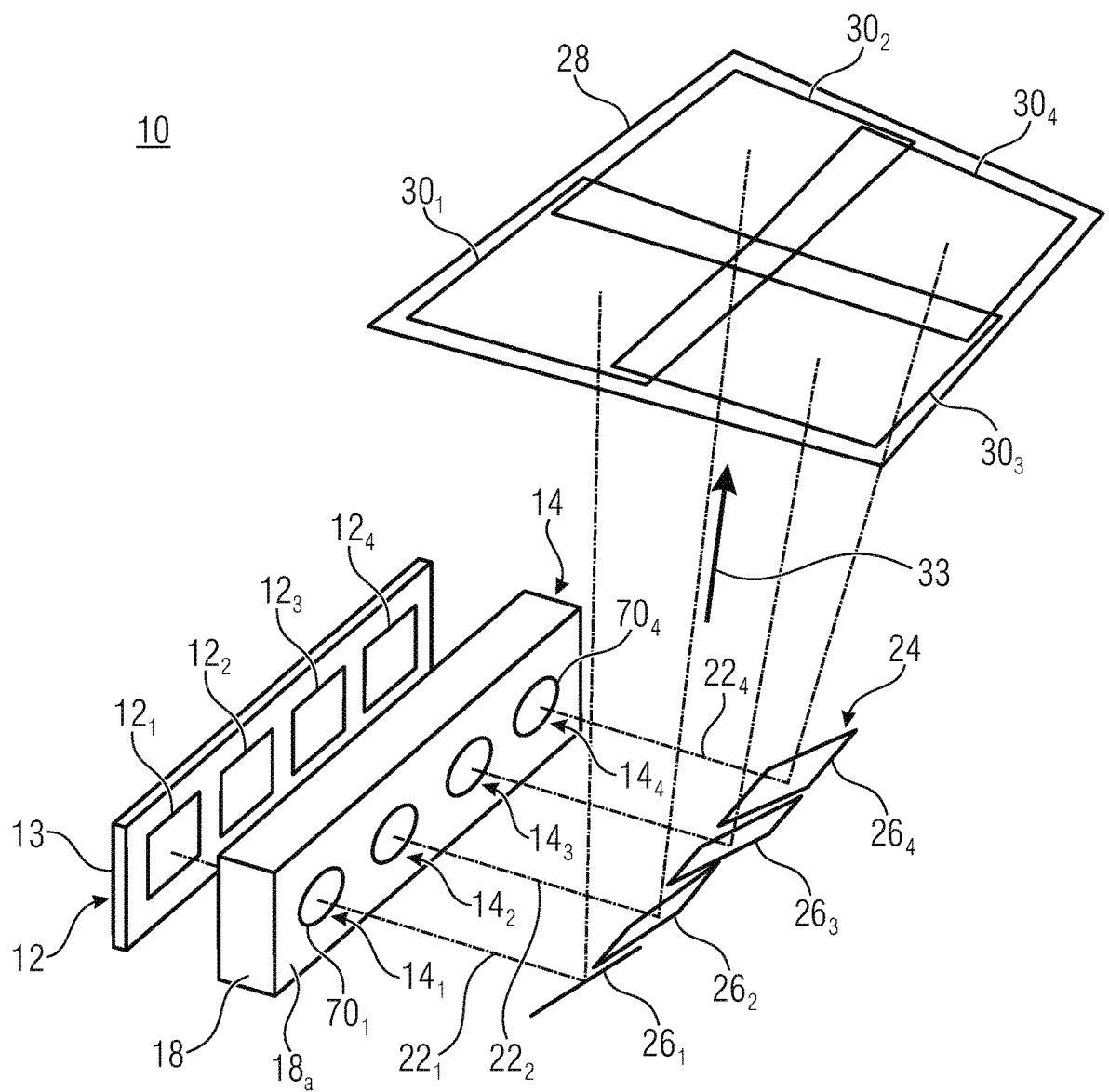
FIG. 1A shows a perspective view of a multi-aperture and/or multi-channel imaging device in accordance with an embodiment.
Figure 1B:
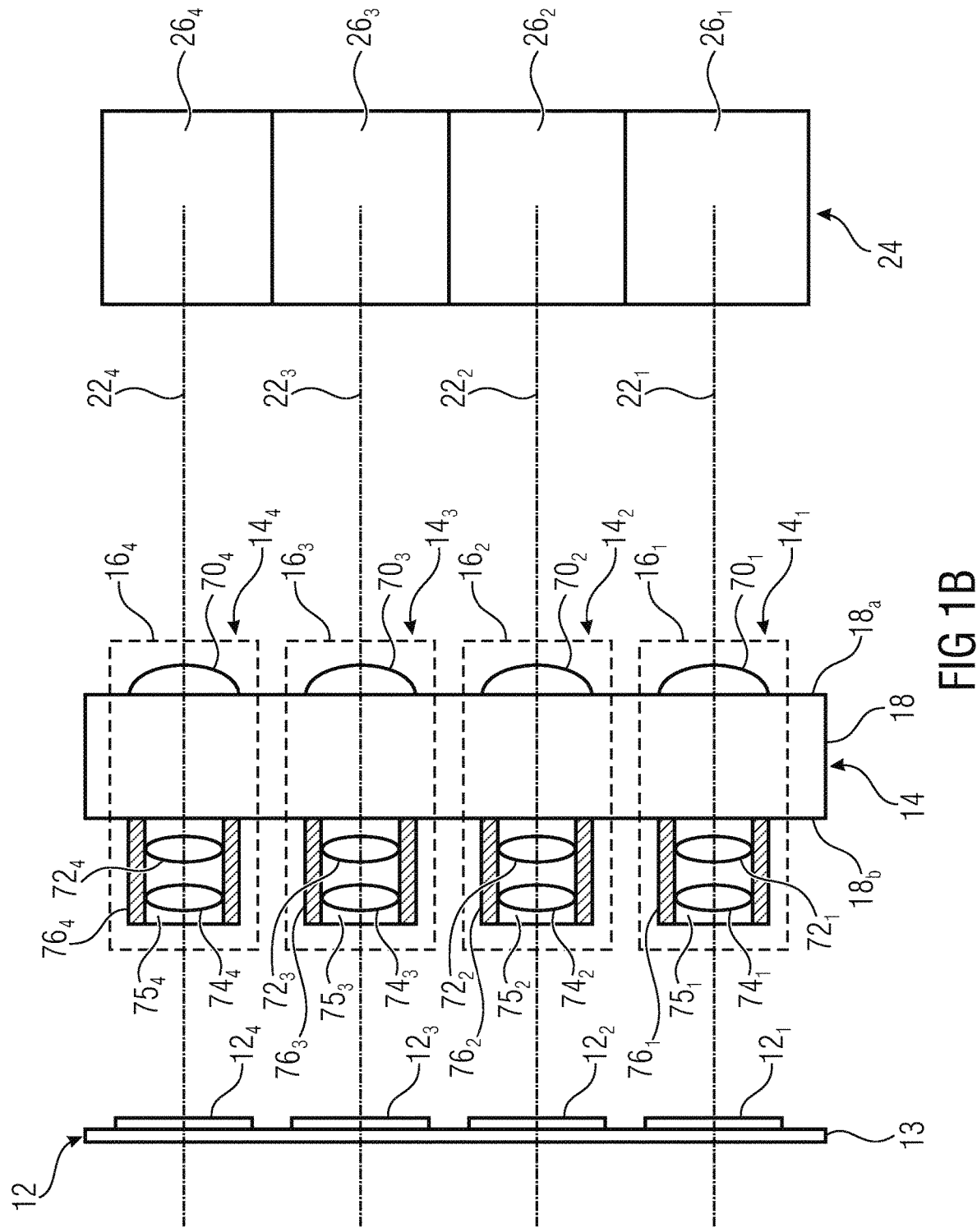
FIG. 1B shows a top view of the multi-aperture imaging device of FIG. 1A.
Figure 1C:
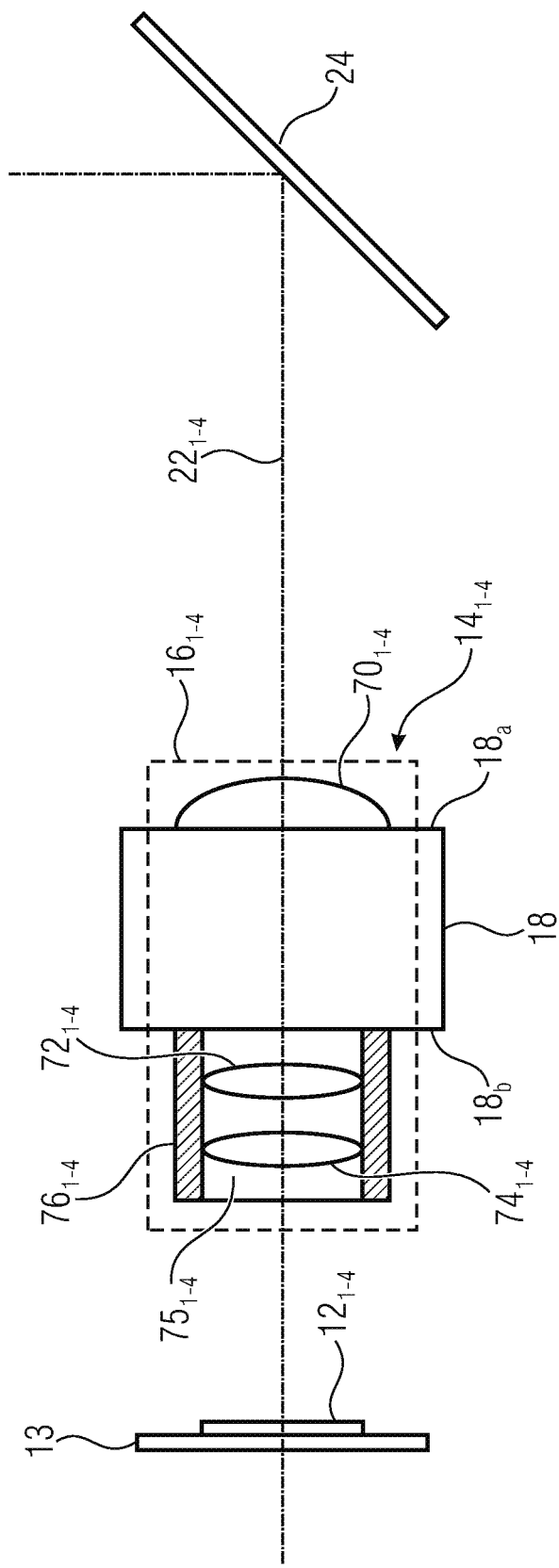
FIG. 1C shows a sectional side view of an optical channel of the multi-aperture imaging device of FIG. 1A.

FIGS. 1A-C show a multi-aperture imaging device 10 in accordance with an embodiment of the present application. The multi-aperture imaging device 10 of FIGS. 1A-C includes a one-line array 14 of adjacently arranged optical channels $14_1$-$14_4$. Each optical channel $14_1$-$14_4$ includes an optic $16_1$-$16_4$ for projecting a respective partial field of view $30_1$ to $30_4$ of a total field of view 28 of the device 10 onto a respectively associated image sensor area $12_1$-$12_4$ of an image sensor 12. The image sensor areas $12_1$-$12_4$ may each be formed of a chip, for example, which includes a corresponding pixel array, it being possible for the chips to be mounted on a shared substrate or circuit board 13, as indicated in FIGS. 1A-1C. Alternatively, it would also be possible, of course, for the image sensor areas $12_1$-$12_4$ to each be formed from a part of a shared pixel array which continuously extends across the image sensor areas $12_1$-$12_4$, the shared pixel array being formed on an individual chip, for example. For example, then only the pixel values of the shared pixel array will be read out in the image sensor areas $12_1$-$12_4$. Various combinations of said alternatives are also possible, of course, such as the presence of a chip for two or more channels and of a further chip for yet other channels or the like. In the event of the image sensor 12 having several chips, said chips may be mounted, e.g., on one or more circuit boards, for example altogether or in groups or the like.

In the embodiment of FIGS. 1A-1C, four channels are adjacently arranged, in one line, in the line extension direction of the array 14; however, the number of four is only exemplary and might also take on any other number larger than one.

Optical axes $22_1$-$22_4$ and/or the optical paths of the optical channels $14_1$-$14_4$ extend in parallel with one another between the image sensor areas $12_1$-$12_4$ and the optics $16_1$-$16_4$. To this end, the image sensor areas $12_1$-$12_4$ are arranged within a shared plane, for example, and so are the optical centers of the optics $16_1$-$16_4$. Both planes are parallel to each other, i.e., parallel to the shared plane of the image sensor areas $12_1$-$12_4$. In addition, in the event of a projection that is perpendicular to the plane of the image sensor areas $12_1$-$12_4$, optical centers of the optics $16_1$-$16_4$ will coincide with centers of the image sensor areas $12_1$-$12_4$. In other words, said parallel planes have arranged therein the optics $16_1$-$16_4$, on the one hand, and the image sensor areas $12_1$-$12_4$, with a same pitch in the line extension direction.

An image-side distance between image sensor areas $12_1$-$12_4$ and the associated optics $16_1$-$16_4$ is set such that the projections onto the image sensor areas $12_1$-$12_4$ are set to have a desired object distance. The distance lies within a range equal to or larger than the focal width of the optics $16_1$-$16_4$ or, e.g., within a range between the focal width or double the focal width of the optics $16_1$-$16_4$, both inclusive. The image-side distance along the optical axis $22_1$-$22_4$ between the image sensor area $12_1$-$12_4$ and the optic $16_1$-$16_4$ may also be settable, e.g., manually by a user or automatically via an autofocusing controller.

Without any additional measures being taken, the partial fields of view $30_1$ to $30_4$ of the optical channels $14_1$-$14_4$ overlapped essentially entirely on account of the parallelism of the optical paths and/or the optical axes $22_1$-$22_4$. To cover a larger total field of view 28 and so that the partial fields of view $30_1$ to $30_4$ exhibit only partial spatial overlap, a beam-deflecting device 24 is provided. The beam-deflecting device 24 deflects the optical paths and/or optical axes $22_1$-$22_4$ with a channel-specific deviation into a total-field-of-view direction 33. The total-field-of-view direction 33, e.g., extends in parallel with a plane that is perpendicular to the line extension direction of the array 14, and extends in parallel with the extension of the optical axes $22_1$-$22_4$ prior to and/or without any beam deflection. For example, the total-field-of-view direction 33 results from the optical axes $22_1$-$22_4$ by a rotation about the line extension direction by an angle which is >0° and <180° and may range from 80 to 100°, for example, and may be 90°, for example. The total field of view of the device 10, which corresponds to the overall coverage of the partial fields of view $30_1$ to $30_4$, thus is not located in the direction of an extension of the series connection of the image sensor 12 and the array 14 in the direction of the optical axes $22_1$-$22_4$, but due to the beam deflection, the total field of view is located laterally in relation to the image sensor 12 and the array 14 in that direction in which the installation height of the device 10 is measured, i.e., the lateral direction that is perpendicular to the line extension direction. However, the beam-deflecting device 24 additionally deflects each optical path, or the optical path of each optical channel $14_1$-$14_4$, with a channel-specific deviation from the deviation that has just been mentioned and that leads to the direction 33. To this end, the beam-deflecting device 24 includes a reflecting facet $26_1$-$26_4$ for each channel $14_1$-$14_4$. Said facets are slightly mutually inclined. The mutual tilting of the facets $26_1$-$26_4$ is selected such that upon beam deflection by the beam-deflecting device 24, the partial fields of view $30_1$ to $30_4$ are provided with a slight divergence such that the partial fields of view $30_1$ to $30_4$ will only partly overlap. As indicated in FIG. 1a by way of example, individual deflection may also be configured such that the partial fields of view $30_1$ to $30_4$ cover the total field of view 28 in a two-dimensional manner, i.e., are arranged in the total field of view 28 such that they are two-dimensionally distributed.

It shall be noted that many of the details described so far in terms of the device 10 have been selected by way of example only. This concerned, for example, the above-mentioned number of optical channels. The beam-deflecting device 24 may also be formed differently than was described so far. For example, the beam-deflecting device 24 does not necessarily have a reflective action. It may also be configured other than in the form of a facet mirror, such as in the form of transparent prism wedges, for example. In this case, the mean beam deflection might amount to 0°, for example, i.e., the direction 33 might be, e.g., parallel to the optical axes $22_1$-$22_4$ even prior to or without any beam deflection, or in other words, the device 10 might continue to "look straight ahead" despite the beam-deflecting device 24. Channel-specific deflection by the beam-deflecting device 24 in turn would result in that the partial fields of view $30_1$ to $30_4$ will mutually overlap to a small degree only, such as in a pair-wise manner with an overlap of <10% in relation to the solid-angle ranges of the partial fields of view $30_1$ to $30_4$.

Also, the optical paths and/or optical axes might deviate from the parallelism described, and nevertheless the parallelism of the optical paths of the optical channels might still be sufficiently pronounced so that the partial fields of view which are covered by the individual channels $14_1$-$14_N$ and/or are projected onto the respective image sensor areas $12_1$-$12_4$ would still for the most part overlap without any further measures being taken, specifically beam deflection, so that, in order to cover a larger total field of view by the multi-aperture imaging device 10, the beam-deflecting device 24 provides the optical paths with an additional divergence such that the partial fields of view of the channels $14_1$-$14_N$ will exhibit less mutual overlap. For example, the beam-deflecting device 24 ensures that the total field of view comprises an aperture angle larger than 1.5 times the aperture angles of the individual partial fields of view of the optical channels $14_1$-$14_N$. With some kind of pre-divergence of the optical axes $22_1$-$22_4$ it would also be possible that, e.g., not all of the facet inclinations differ, but that some groups of channels include, e.g., the facets having equal inclinations. The latter may then be formed to be integral and/or to continually merge into one another as a facet, as it were, which is associated with said group of channels adjacent in the line extension direction. The divergence of the optical axes of these channels might then originate from the divergence of these optical axes as is achieved by a lateral offset between optical centers of the optics and image sensor areas of the channels or prism structures or decentered lens sectors. The pre-divergence might be limited to a plane, for example. The optical axes might extend, e.g., within a shared plane prior to, or without any, beam deflection, but extend in a divergent manner within said plane, and the facets cause only an additional divergence within the other transversal plane, i.e. they are all inclined in parallel with the line extension direction and are mutually inclined only in a manner that is different from the above-mentioned shared plane of the optical axes; here, again, several facets may have the same inclination and/or be commonly associated with a group of channels whose optical axes differ pair by pair, e.g. already within the above-mentioned shared plane of the optical axes, prior to or without any beam deflection.

When the beam-deflecting device is dispensed with or configured as a planar mirror or the like, the overall divergence might also be accomplished by the lateral offset between optical centers of the optics, on the one hand, and centers of the image sensor areas, on the other hand, or by prism structures or decentered lens sectors.

Figure 1D:
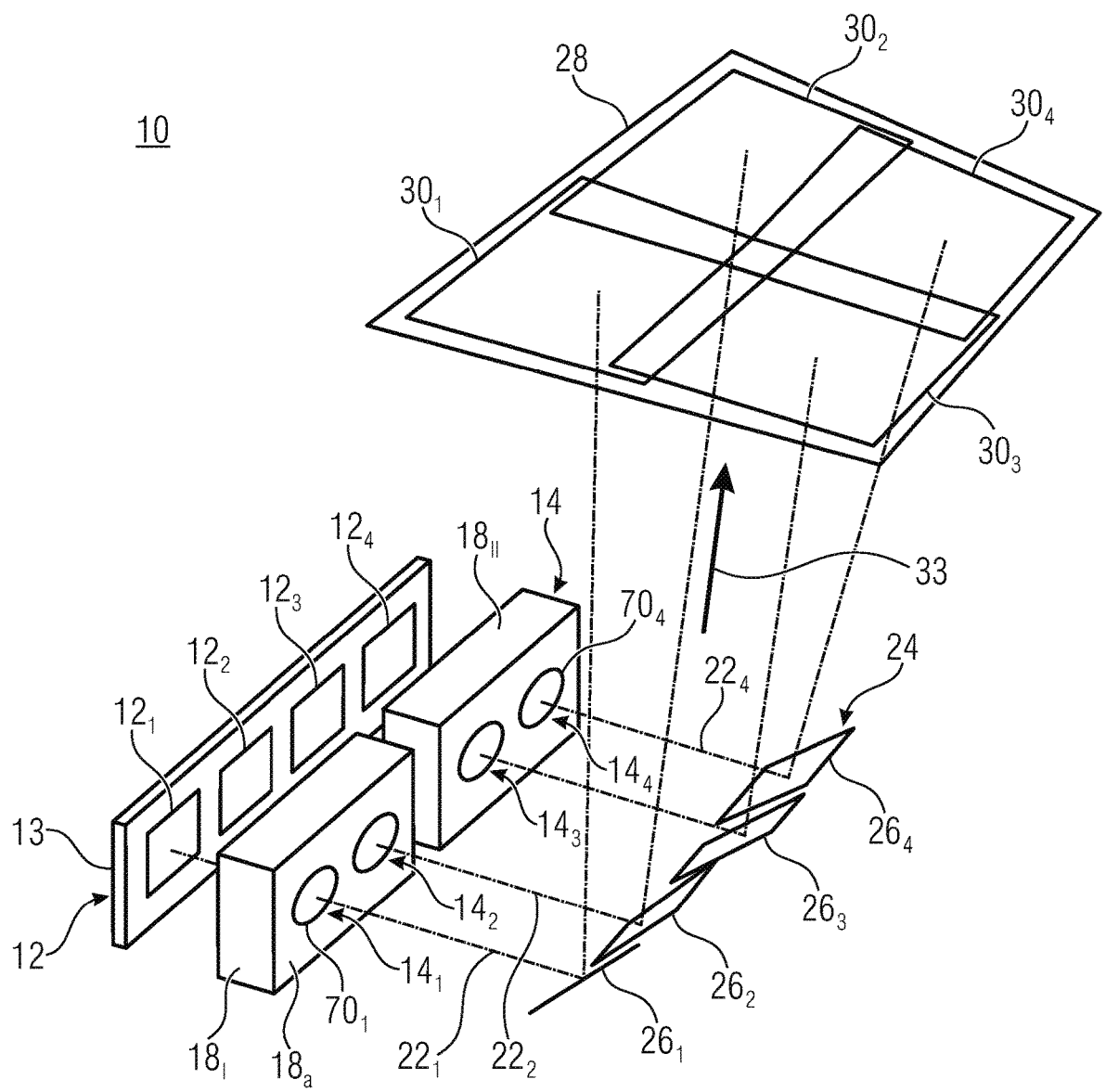
FIG. 1D shows a perspective view of a multi-aperture imaging device in accordance with a variant wherein the channel optics are distributed across two carrier substrates along the line extension direction.
Figure 1F:
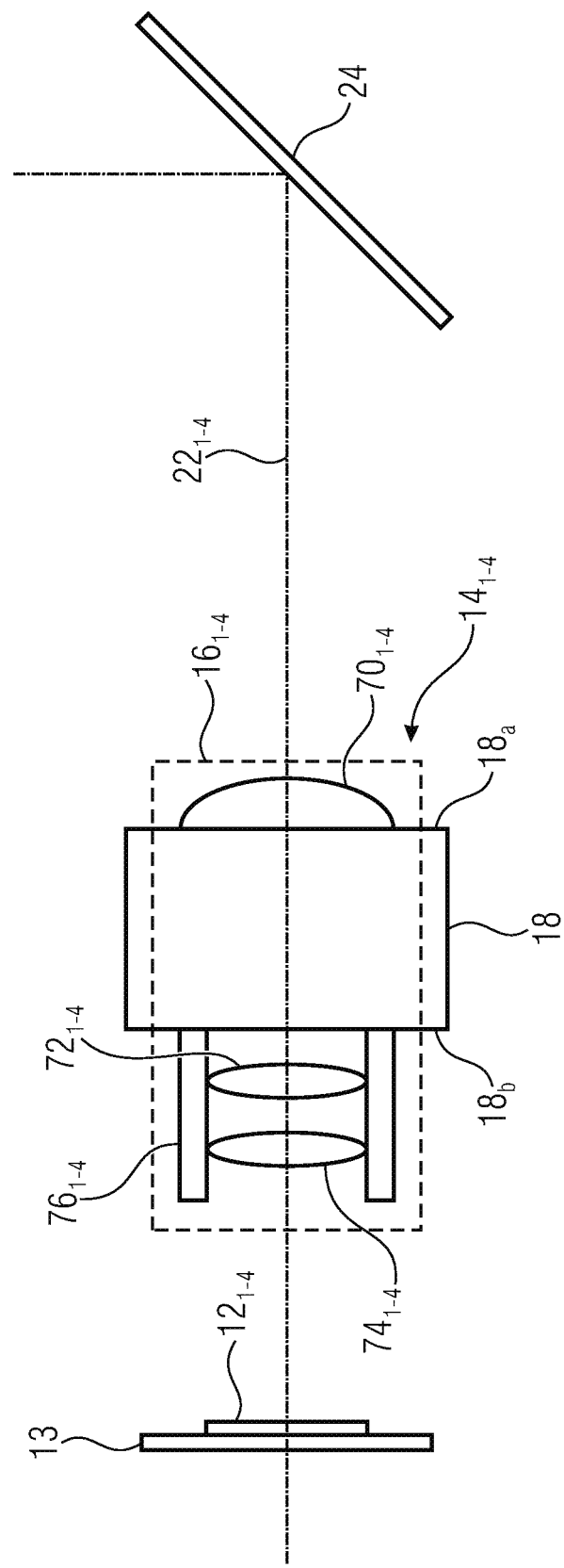

The above-mentioned possibly existing pre-divergence may be achieved, for example, in that the optical centers of the optics lie on a straight line along the line extension direction, whereas the centers of the image sensor areas are arranged such that they deviate from the projection of the optical centers along the normal of the plane of the image sensor areas onto points that lie on a straight line within the image sensor plane, for example at points which deviate from the points that lie on the above-mentioned straight line within the image sensor plane, in a channel-specific manner, along the line extension direction and/or along the direction perpendicular to both the line extension direction and the image sensor normal. Alternatively, pre-divergence may be achieved in that the centers of the image sensors lie on a straight line along the line extension direction, whereas the centers of the optics are arranged to deviate from the projection of the optical centers of the image sensors along the normal of the plane of the optical centers of the optics onto points that lie on a straight line within the optic center plane, for example at points which deviate from the points that lie on the above-mentioned straight line within the optical center plane, in a channel-specific manner, along the line extension direction and/or along the direction perpendicular to both the line extension direction and the normal of the optical center plane. It is advantageous that the above-mentioned channel-specific deviation from the respective projection take place only in the line extension direction, i.e. that the optical axes which are located merely within a shared plane be provided with a pre-divergence. Both optical centers and image sensor area centers will then each be located on a straight line in parallel with the line extension direction, but with different intermediate gaps. A lateral offset between lenses and image sensors in the lateral direction perpendicular to the line extension direction would therefore result in an increase in the installation height. A mere in-plane offset in the line extension direction does not change the installation height but might possibly result in a reduced number of facets and/or in that the facets are tilted only in an angle orientation, which simplifies the design. This is illustrated in FIGS. 1f and 1g, wherein the adjacent channels $14_1$ and $14_2$, on the one hand, and the adjacent channels $14_3$ and $14_4$ comprise optical axes $14_1$ and $14_2$ and $14_3$ and $14_4$, respectively, which extend with the shared plane and squint in relation to one another, i.e. are provided with a pre-divergence. The facets $26_1$ and $26_2$ may be formed by one facet, and the facets $26_3$ and $26_4$ may be formed by another facet, as indicated by dashed lines between the respective pairs of facets, and the only two facets are inclined merely in one direction and are both parallel to the line extension direction.

Moreover, provision might be made for some optical channels to be associated with the same partial field of view, e.g. for the purpose of achieving a super-resolution and/or for increasing the resolution with which the corresponding partial field of view is scanned by said channels. The optical channels within such a group would then extend in parallel, e.g. prior to beam deflection, and would be deflected onto a partial field of view by one facet. Advantageously, pixel images of the image sensor of a channel of one group would be located at intermediate positions between images of the pixels of the image sensor of another channel of this group.

What would also be feasible, for example, even without any super-resolution purposes, but only for stereoscopy purposes, would be an implementation wherein a group of directly adjacent channels fully cover the total field of view with their partial fields of view in the line extension direction, and that a further group of mutually directly adjacent channels, for their part, fully cover the total field of view and that the optical paths of both groups of channels pass through the substrate 18.

The explanation which follows deals with the optics $16_1$-$16_4$, whose lens planes are also parallel to the shared plane of the image sensor areas $12_1$-$12_4$. As will be described below, lenses of the optics $16_1$-$16_4$ of the optical channels $14_1$-$14_4$ are attached to a main side of a substrate 18 via one or more lens holders and are mechanically connected to one another via the substrate 18. In particular, the optical paths of the plurality of optical channels $14_1$-$14_4$ extend through the substrate 18. The substrate 18 is thus formed of transparent material and is plate-shaped or has, e.g. the shape of a parallelepiped or of another convex body having a planar main side $18_a$ and an opposite main side $18_b$, which is also planar. Advantageously, the main sides are positioned perpendicularly to the optical axes $22_1$-$22_4$. As will be described below, in accordance with embodiments there may be deviations from the pure parallelepiped shape, which are to be attributed to the fact that lenses of the optics are formed integrally with the substrate.

In the embodiment 1A-1C, the flat carrier substrate 18 is a substrate made of glass or polymer, for example. The material of the substrate 18 may be selected in terms of a high degree of optical transparency and a low temperature coefficient or further mechanical properties such as hardness, modulus of elasticity or torsion, for example.

The substrate may be configured as a simple planar part of the optical path without any additional lenses being accommodated directly thereon. Additionally, diaphragms such as aperture or stray-light diaphragms or/and filter layers such as IR block filters, for example, may be mounted on the substrate surfaces or consist of several sheets of various substrates whose surfaces may have diaphragms and filter layers mounted thereon, which in turn may differ, channel by channel, e.g. in terms of their spectral absorption.

The substrate may consist of a material which exhibits different properties, in particular non-constant absorption, in different areas of the electromagnetic spectrum that may be detected by the image sensor.

In the embodiment of FIGS. 1A-1C, each optic $16_1$-$16_4$ includes three lenses. However, the number of lenses is freely selectable. The number might be 1, 2 or any other number. The lenses may be convex, may comprise only an optically imaging functional area such as a spherical, an aspheric, a freeform surface, or two, e.g. two mutually opposite ones, so as to result in, e.g. a convex or a concave lens shape. Several optically active lens surfaces are also possible, e.g. by building a lens from several materials.

A first lens $70_1$-$70_4$ of each optic $16_1$-$16_4$ is formed on the main side $18_a$ in the embodiment of FIGS. 1a-1c. The lenses $70_1$-$70_4$ have been produced by being molded on the main side $18_a$ of the substrate 18 and consist, e.g., of polymer such as UV-curable polymer. The molding is performed, e.g., by means of a molding tool, and the hardening may be effected, e.g., by means of temperature and/or by means of UV irradiation.

In the embodiment of FIGS. 1A-1C, each optic $16_1$-$16_4$ has a further second and third lens $72_1$-$72_4$ and $74_1$-$74_4$, respectively. Said lenses are mutually fixed in place, by way of example, inside the respective lens holder via axially extending tubular lens holders $76_1$-$76_4$ and are fixed to the main side $18b$ via said respective lens holder, such as by means of adhesion or any other joining technology. The openings $75_1$-$75_4$ of the lens holders $76_1$-$76_4$ are provided, for example, with a circular cross section within whose cylindrical interior the lenses $72_1$-$72_4$ and $74_1$-$74_4$, respectively, are attached. For each optic $16_1$-$16_4$, the lenses are thus located in a coaxial manner on the respective optical axis $22_1$-$22_4$. However, the lens holders $76_1$-$76_4$ may also have cross sections which change across their lengths and/or along the respective optical axes. The cross section may adopt an increasingly rectangular or square character as the distance from the image sensor 12 decreases. The outer shape of the lens holders may thus also differ from the shape of the openings. The material of the lens holders may be light-absorbing.

Figure 3A:
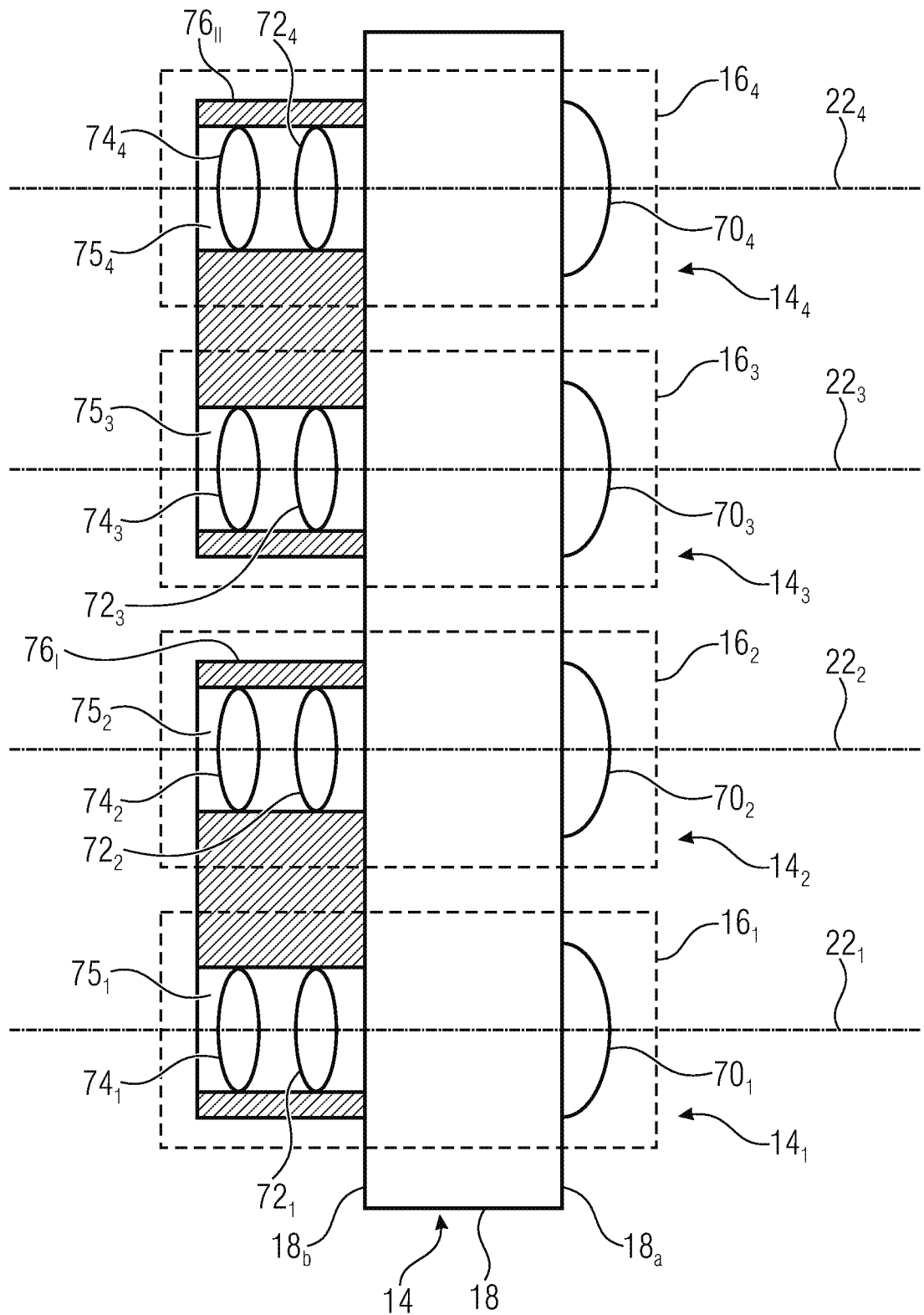
FIG. 3A shows a top view of a one-line array of adjacently arranged optical channels in accordance with a variant wherein the optics of adjacent channels are mounted on the substrate via a shared lens holder.

Even though the lens holders $76_1$-$76_4$ have been described as separate parts for each channel of the multi-aperture imaging device, they may also be configured as a contiguous body, i.e. a body carrying lenses of all of the optical channels. Alternatively, it would be possible for the channels to share such a lens holder group by group, i.e. it would be possible for several lens holders to be present, each one for lenses of a different group of channels. The latter case is depicted in FIG. 3A. A lens holder $76_I$ has openings $75_1$-$75_2$ for the lenses $72_1$, $72_2$, $74_1$, $74_2$ of the optics $14_1$ and $14_2$, and a lens holder $76_{II}$ has openings 753-754 for the lenses $72_3$, $72_4$, $74_3$, $74_4$ of the optics $14_3$ and $14_4$.

Attachment via the above mentioned lens holders is effected, for example, as is depicted in FIGS. 1A-3A, such that lens vertices of the lenses held by same are spaced apart from the substrate 18.

As was already mentioned above, it is possible for the substrate 18 to be planar on both sides and to consequently exhibit no refractive-power effect. However, it would also be possible for the substrate 18 to comprise mechanical structures such as depressions or projections, for example, which enable easy positive and/or non-positive alignment of abutting components, such as the abutment of individual lenses or housing parts. In the embodiment of FIGS. 1A-1C, for example, the substrate 18 might comprise, on the main side $18b$, structures which facilitate attachment or orientation at those positions where the respective end of the tube of the lens holder $76_1$-$76_4$ of the respective optic $16_1$-$16_4$ is attached. Said structures may be circular depressions, for example, or depressions of any other shape which corresponds to the shape of such a side of the respective lens holder that faces the substrate and into which the side of the respective lens holders $76_1$-$76_4$ may engage. It shall be emphasized once again that other opening cross sections and thus, corresponding therewith, types of lens apertures other than circular ones might also be possible.

Thus, the embodiment of FIGS. 1A-1C differs from a classical structure of camera modules which comprise individual lenses and a non-transparent housing carrier which completely encloses the individual lenses in order to fasten them. Rather, the above embodiment uses a transparent body 18 as the substrate carrier. Said substrate carrier extends across several adjacent channels $14_1$-$14_4$ so as to be penetrated by their optical imaging path. Said substrate carrier does not interfere with the imaging process and also does not increase the installation height.

However, various possibilities of how the embodiment of FIGS. 1A-1C might be varied shall be pointed out. For example, the substrate 18 does not necessarily extend across all of the channels $14_1$-$14_4$ of the multi-aperture imaging device 10. It would be possible that the substrate 18 extends across only adjacent channels $14_1$-$14_4$ in groups, e.g. in pairs, e.g. that several carriers $18_I$ and $18_{II}$ are present, as is illustrated in FIG. 1D. For example, in the embodiment of FIGS. 1A-1C, the channels $14_1$-$14_2$ might pass through a first carrier $18_I$ carrying the optics $16_1$-$16_2$, whereas the channels $14_3$ and $14_4$, or their optical paths, penetrate a further carrier $18_{II}$ carrying the optics $16_3$ and $16_4$.

Figure 2:
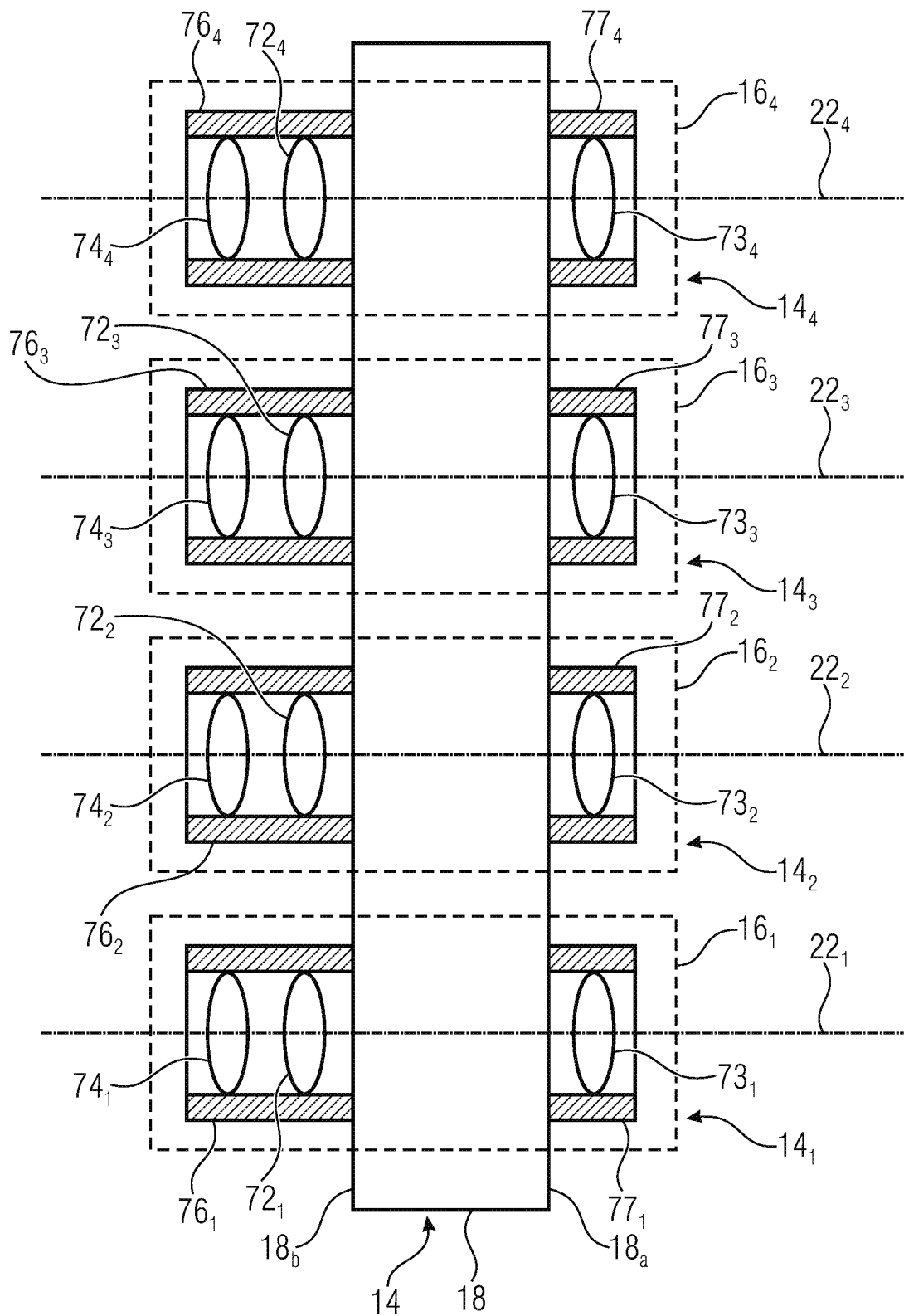
FIG. 2 shows a top view of the one-line array of optical channels in accordance with an alternative, according to which the optics of the optical channels comprise merely lenses which are attached to the substrate via spacers.

Unlike what was described above, it would be possible for each optic $16_1$-$16_4$ to comprise, on both sides $18_a$ and $18_b$, lenses held only via lens holders. This possibility is shown in FIG. 2 by way of example.

It would also be possible for the substrate 18 to consist of two substrates 18' and 18", the front sides of which form the main sides $18_b$ and $18_a$, respectively, on which the lenses are formed or to which the lenses are attached, while their rear sides are joined to each other, wherein any joining technologies may be used which maintain the transparency or transmittance for the optical path of the respective optical channel. This is depicted in FIG. 1e by way of example for the case of FIGS. 1A-1C.

It would also be feasible for only the lenses $72_1$-$74_2$ to exist only on the main side $18_b$, i.e. without the lenses $70_1$-$70_4$ on the other side $18_a$, just as it would be feasible to provide the lenses in accordance with $72_1$-$74_4$ on the other side $18_a$, i.e. on that side of the substrate 18 which faces away from the image sensor 12, rather than on the side facing it, $18_a$. Likewise, the number of lenses present within a lens carrier $76_1$-$76_4$ is freely selectable. For example, it would also be possible for only one lens or for more than two lenses to be present within such a carrier $76_1$-$76_4$. As shown in FIG. 2, it would be possible for lenses to be mounted on both sides $18_a$ and $18_b$ to the respective sides $18_a$ and/or $18_b$ via respective lens carriers $76_1$-$76_4$ and $77_1$-$77_4$, respectively. As compared to FIGS. 1A-1C, in FIG. 2, for example, the lenses $72_1$-$74_4$ have been replaced by lenses $73_1$-$73_4$, which are mounted on the main side $18_a$ by lens carriers $77_1$-$77_4$.

Likewise, it would also be possible for there to be no molded lens in accordance with $70_1$-$70_4$ on the main side $18_a$, but for there to be present only the lenses mounted on the side $18_b$ via the respective lens carrier; here again, the same might also be true for the other side $18_a$.

In deviation from the above embodiments, the body of the carrier 18 might also be provided with a refractive-power effect in deviation from the merely planar shapes of the sides $18_a$ and $18_b$. In other words, lenses in accordance with $70_1$-$70_4$ might be formed integrally with the carrier 18, for example by means of injection molding or glass embossing or the like. This is to be indicated by the dashed line of the interface between the lenses $70_1$-$70_4$ and the carrier 18 in FIGS. 1A and 1B. Diaphragms such as aperture or stray-light diaphragms or/and filter layers such as IR block filters, for example, might also be provided at this interface between the lenses and the substrate carrier. Additionally or alternatively, diaphragms such as aperture or stray-light diaphragms or/and filter layers such as IR block filters, for example, may be provided on that main side on which lenses of the optics are mounted via lens holders, namely at those positions where the optical paths penetrate the substrate 18. In the event of a main side of the substrate which does not comprise any lens of the optics, neither via lens holders nor in any other way, such diaphragms or layers may evidently also be possible at those positions which are penetrated by the optical paths.

As was already mentioned, it is also possible to manufacture a carrier having the bulged lenses $70_1$-$70_4$ on the main side $18_a$ by means of glass embossing, polymer embossing or by means of polymer or glass injection molding.

It would be feasible that molded lenses $70_1$-$70_4$ are arranged on the same main side in a manner that is axially central to lenses held via lens holders, i.e. that the lens holders are mounted, for example by means of gluing, to the corresponding main side, and that the lenses held by same are located opposite further lenses which are molded out of the substrate material in the same main side or are molded onto the same main side.

Even though in the above embodiments, arrangements having only one carrier substrate were described, it is also possible for the structure to include several carrier substrates.

Thus, it is possible in the above-described manner to provide a one-line array of optical channels with optics whose optically functional lens areas are identical for all channels. However, it would also be possible to provide the lenses for each channel with an individual deviation as compared to the lenses of the other optical channels, for example for the purpose of balancing off any imaging deviations among the channels which are due to the channel-specific beam deflection such as by the beam-deflecting device 24. Moreover, the channels might be rendered sensitive to different spectral ranges, or be varied in terms of their spectral transparency, by using different materials for the lenses of the respective optical channels. Each channel would then have a different spectral filtering effect, for example. It would be possible, for example, for groups of channels to project a shared partial field of view, or a fully overlapping partial field of view, to the respective image sensor area.

By way of example, FIG. 4 also shows that the multi-aperture imaging device 10 of FIGS. 1A-1C might be supplemented by one or more of the subsequently described additional means.

For example, FIG. 4 shows that means 50 might be present for rotating the beam-deflecting device 24 about an axis parallel to the line extension direction of the array 14. The axis of rotation is located, e.g., within the plane of the optical axes $22_1$-$22_4$ or is spaced apart therefrom by less than a quarter of a diameter of the optics $16_1$-$16_4$. Alternatively, it would also be possible, of course, for the axis of rotation to be located at a farther distance, e.g. to be spaced apart less than an optic's diameter or less than four optics' diameters. The means 50 may be provided, for example, to rotate the beam-deflecting device 24 with a short response time within a merely small range of angles, e.g. within a range of less than 10° or less than 20° so as to balance off any shaking of the multi-aperture imaging device 10, e.g. on the part of a user during image capturing. In this case, the means 50 would be controlled by an image-stabilization controller, for example.

Alternatively or additionally, the means 50 might be configured to change, with relatively large angle adjustments, the total field of view, which is defined by the total coverage of the partial fields of view $30_1$ to $30_4$ (FIG. 1), in terms of its direction. In this context it would also be possible to achieve deflections, by rotating the beam-deflecting device 24, in which the total field of view is arranged in the opposite direction relative to the device 10, for example in that the beam-deflecting device 24 is configured as a mirror array reflecting on both sides.

Yet again, alternatively or additionally, the device 10 may comprise means 52 for translationally moving the optics $16_1$-$16_4$ by means of the substrate 18, or to move the substrate 18 itself and, thus, the optics 16₁-16₄ along the line extension direction. The means 52 might then also be controlled, e.g., by the above-mentioned image stabilization controller so as to achieve, on account of the movement 53 along the line extension direction, image stabilization which is transverse to the image stabilization implemented by the rotation of the mirror deflection device 24.

Moreover, the device 10 may additionally or alternatively comprise means 54 for changing the image-side distance between the image sensor 12 and the optics 16₁-16₄ and/or between the image sensor 12 and the body 18, so as to achieve depth-of-field adjustment. The means 54 may be controlled by means of manual user control or by an autofocusing controller of the device 10.

Thus, the means 52 serves as a suspension of the substrate 18 and is advantageously arranged, as is indicated in FIG. 4, laterally adjacent to the substrate 18 along the line extension direction so as not to increase the installation height. Means 50 and 54 are also advantageously arranged within the plane of the optical paths so as not to increase the installation height.

It should be noted that the optics 16₁-16₄ may be held in a constant relative location, not only with regard to one another, e.g. via the above-mentioned transparent substrate, but also in relation to the beam-deflecting device, such as via a suitable frame which advantageously does not increase the installation height and therefore advantageously extends within the plane of the components 12, 14 and 24, and/or within the plane of the optical paths. The constancy of the relative location might be restricted to the distance between the optics and the beam-deflecting device along the optical axes, so that the means 54 translationally moves, e.g., the optics 16₁-16₄ along the optical axes together with the beam-deflecting device. The distance between the optics and the beam-deflecting device might be adjusted to a minimum distance, so that the optical path of the channels is not laterally restricted by the segments of the beam-deflecting device 24, which reduces the installation height, since otherwise the segments 26ᵢ would have to be dimensioned, with regard to the lateral extension, for the largest distance between the optics and the beam-deflecting device so as not to pinch the optical path. Additionally, the constancy of the relative location of the above-mentioned frames might rigidly hold the optics and the beam-deflecting device in a mutually rigid manner along the x axis, so that the means 52 would translationally move the optics 16₁-16₄ along the line extension direction together with the beam-deflecting device.

The above-described beam-deflecting device 24 for deflecting the optical path of the optical channels enables, along with the actuator 50 for producing of the rotational movement of the beam-deflecting device 24 of an optical image stabilization controller of the multi-aperture imaging device 10, stabilization of the image and of the total field of view in two dimensions; specifically, by means of the translational movement of the substrate 18, it enables image stabilization along a first image axis, which extends essentially in parallel with the line extension direction, and by said generation of the rotational movement of the beam-deflecting device 24, it enables image stabilization along a second image axis, which extends essentially in parallel with the optical axis prior to and/or without any beam deflection, or—when one looks at the deflected optical axes—extends perpendicularly to the optical axes and to the line extension direction. Additionally, the described arrangement may cause a translational movement of the beam-deflecting device, which is fixed in place in the above-mentioned frame, and of the array 14 in a manner that is perpendicular to the line extension direction, for example, by means of the described actuator 54, which translational movement may be used for realizing focus adjustment and, thus, an autofocus function.

For completeness' sake, it should also be noted with regard to the above illustrations that during capturing, the device captures an image of a scene per channel via the image sensor areas, which have been projected onto the image sensor areas through the channels, and that the device may optionally comprise a processor which joins or merges the images to form an overall image which corresponds to the scene in the total field of view, and/or provides additional data such as 3D image data and depth information of the object scene, for example, to produce bathymetric charts and for software-related realization such as refocusing (defining the image sharpness areas following the actual capturing), all-in-focus images, virtual green screen (separation of foreground and background), for example, and others. The latter tasks might also be performed by said processor or be performed externally. However, the processor might also represent a component that is external to the multi-aperture imaging device.

Figure 5:
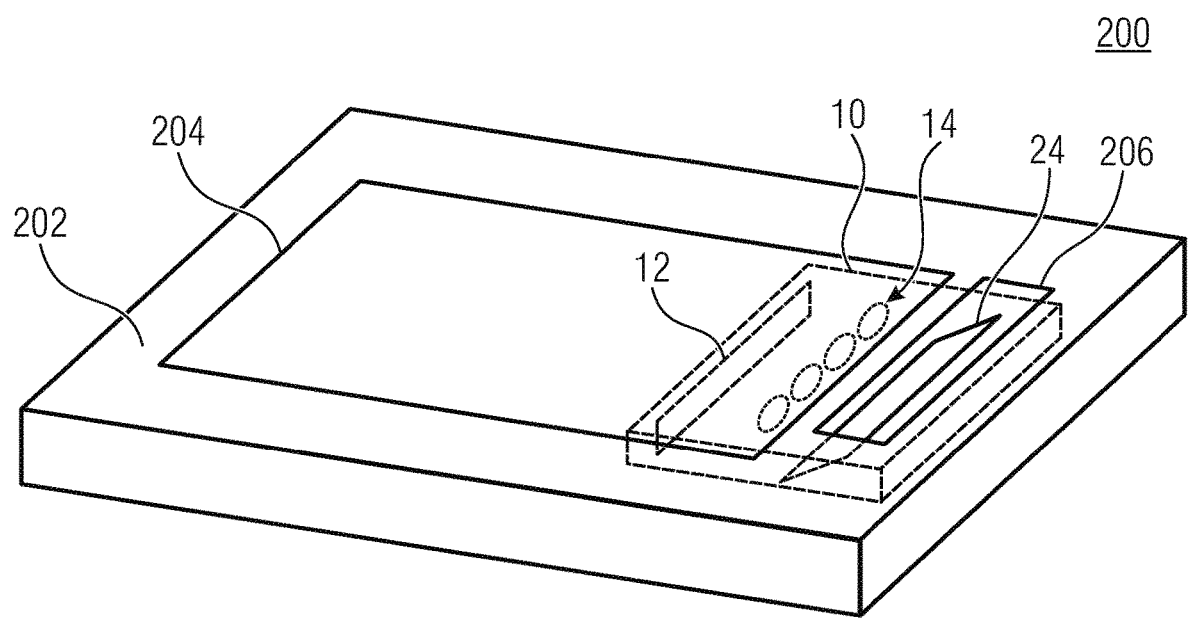
FIG. 5 shows a perspective view of a mobile device for illustrating installation of the multi-aperture imaging device.
Figure 6:
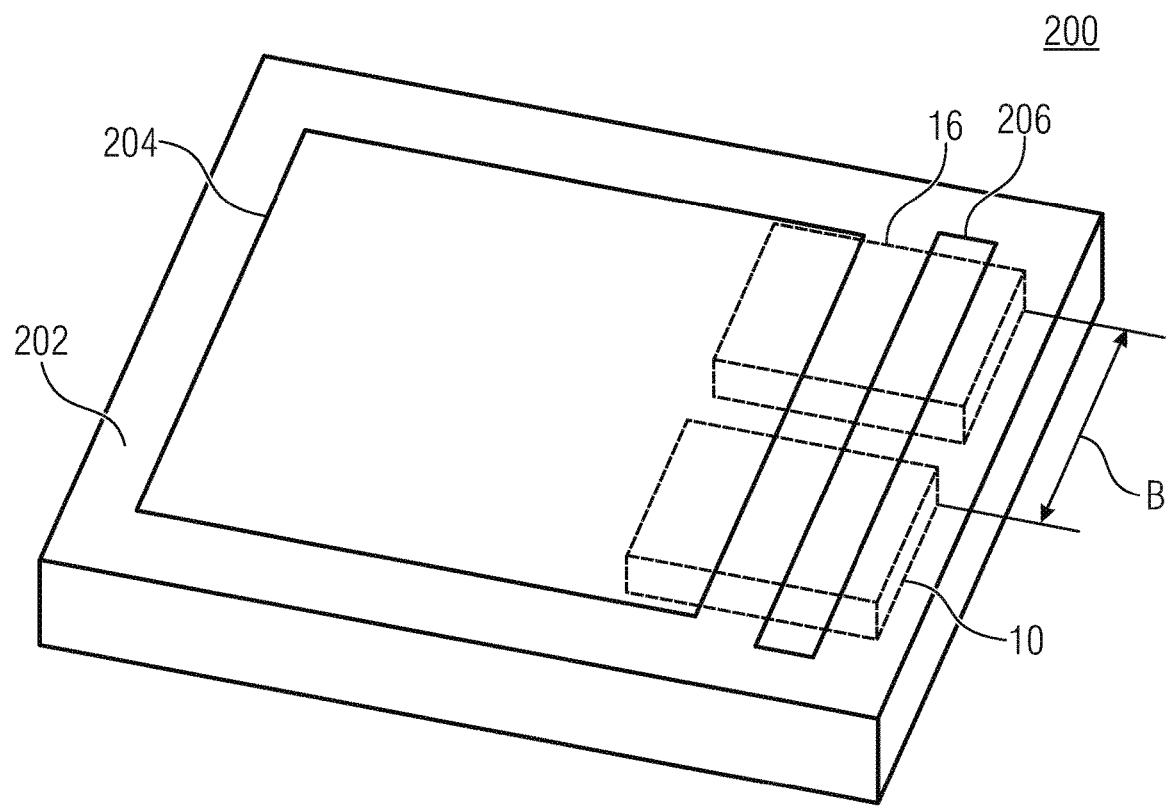
FIG. 6 shows a perspective view of a mobile device for illustrating installation of two multi-aperture imaging devices for stereoscopy purposes.

FIG. 5 illustrates that devices 10 of the previously described alternatives may be installed, e.g., into a flat housing of a portable device 200, e.g. of a mobile phone, a smartphone or a media player or the like, in which case e.g. the planes of the image sensor 12 and/or of the image sensor areas as well as the lens planes of the optics of the channels 14 are aligned perpendicularly to the flat extension direction of the flat housing and/or in parallel with the thickness direction. In this manner, the beam-deflecting device 24 would ensure, e.g., that the total field of view of the multi-aperture imaging device 10 is located in front of a front side 202 of the flat housing, which also comprises a screen, for example. Alternatively, deflection would also be possible such that the field of view be located in front of a rear side of the flat housing, said rear side being located opposite the front side 202. The housing might comprise a transparent window 206 in the penetrated side 202 so as to allow the optical paths of the optical channels 14 to pass through. Moreover, switchable diaphragms (mechanically moved, electrochromic) might be mounted so as to influence the entrance of light through the opening of the window on the front and/or rear sides. The housing of the device 200, or the device itself, may be flat since, due to the illustrated location of the device 10 within the housing, the installation height of the device 10, which is parallel to the thickness of the housing, may be kept small. Switchability might also be provided by providing a window on that side which is located opposite the side 202 and by moving the beam-deflecting device between two positions, for example, in that the latter is configured as a mirror reflecting on the front and rear sides, for example, and is rotated from one position to the other, or is configured as a facet mirror comprising a set of facets for one position and a different set of facets for the other position, the sets of facets being located next to one another in the line extension direction, and switching between the positions taking place by translationally moving the beam-deflecting device to and fro along the line extension direction. Installing the device 10 in another, possibly non-portable, device such as a car would also be possible, of course. FIG. 6 also shows that several modules 10, whose partial fields of view of their channels fully and, optionally even congruently, cover the same field of view, may be installed within the device 200, for example with a base distance B from one another along a line extension direction which is the same for both modules, for example for the purpose of stereoscopy. More than two modules would also be feasible. The line extension directions of the modules 10 might also not be collinear but merely parallel to one another. However, it should be noted once again that, as was mentioned above, it would also be possible for a device 10 and/or a module to be equipped with channels such that said channels fully cover the same total field of view in each case in a group-by-group manner.

It should also be mentioned that the beam-deflecting device may also be dispensed with in alternative embodiments as compared to the above-described embodiments. If only partial mutual overlap of the partial fields of views is desired, this might be achieved, for example, via mutual lateral offsets between the center of the image sensor area and the optical center of the optic of the corresponding channel. The actuators of FIG. 4 might nevertheless be applied, of course; in the event that the means 50 is replaced, for example, the actuator 52 is additionally capable of translationally moving the optics and/or the carrier 18.

Figure 3B:
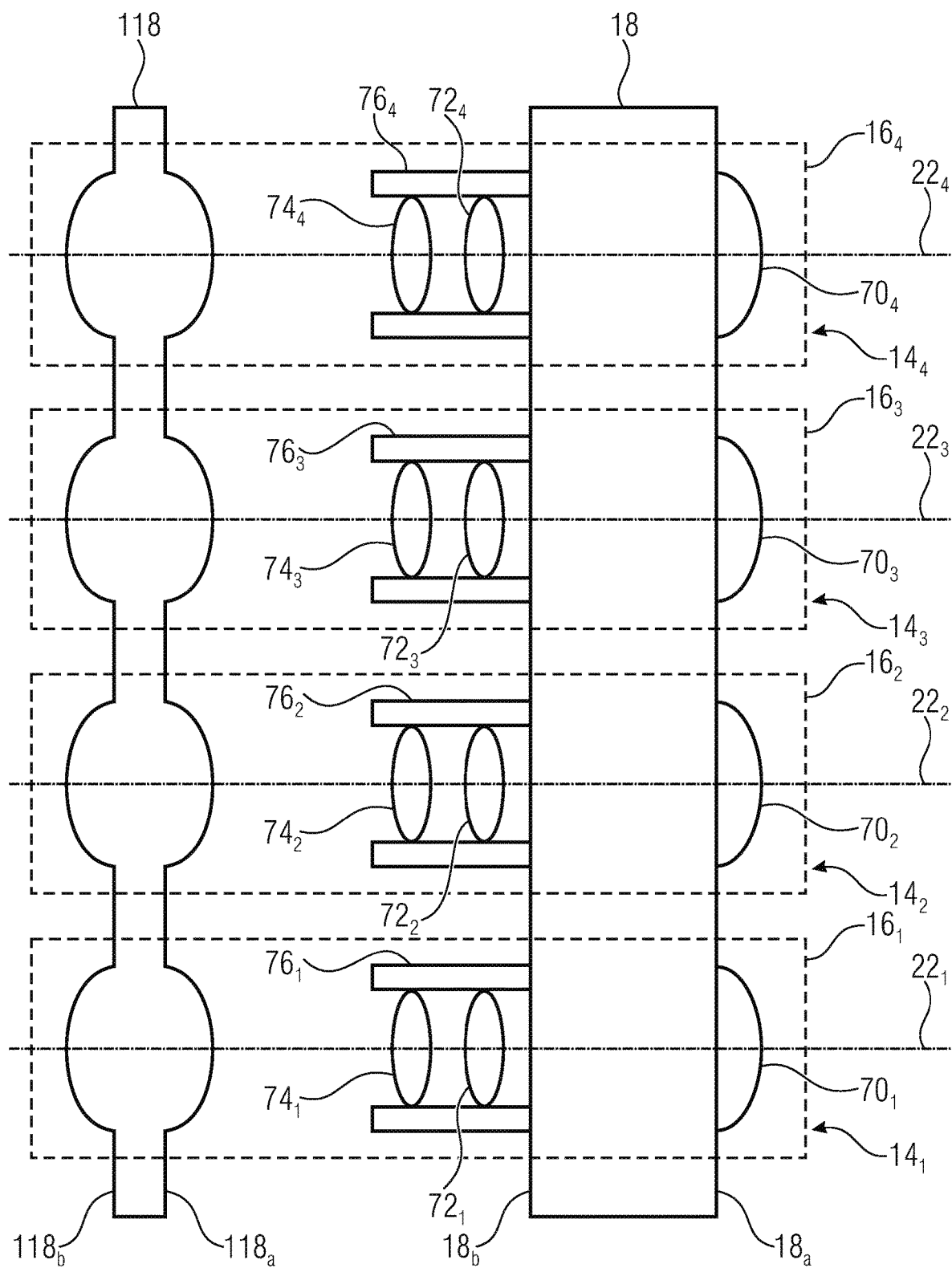
FIG. 3B shows a top view of a one-line array of adjacently arranged optical channels in accordance with a variant wherein the lenses of the optics are distributed across several carrier substrates.

In yet other words, the above embodiments thus show a multi-aperture imaging device having a one-line array of adjacently arranged optical channels and having a substrate which extends across the channels somewhere in the optical path of the multi-aperture imaging device and is made of glass or polymer, for example, to improve stability. Additionally, the substrate may include lenses already on the front and/or rear side(s). The lenses may consist of the material of the substrate (created by heat embossing, for example), or be molded thereon. In front of and behind the substrate there may be further lenses which are not located on substrates and are mounted individually. It is possible for several substrates to be present within one structure, both along the line extension direction, as depicted in FIG. 1D, and perpendicularly to the line extension direction, as shown in FIG. 1E. As shown in FIG. 3B, it would also be possible, as compared to the variant of FIG. 1E, to connect several substrates having lenses in series along the optical paths, i.e. to keep them one behind the other in a predetermined mutual positional relationship, e.g. via a frame, without it being necessary to join them as in FIG. 1E. In this manner, the number of main sides available for providing and/or attaching lenses would be twice the number of carrier substrates used, namely a substrate 18 in the example of FIG. 3B, which, in accordance with the above examples, may be populated with lenses, here in accordance with FIG. 1B by way of example, and a substrate which may also be populated with lenses in accordance with the above examples, i.e. among other things with lenses attached to the main sides 118$_a$ and/or 118$_b$ via lens holders, but which are here depicted, by way of example, to be integrally manufactured by means of injection molding or the like, for example, such that lenses are formed on both sides 118$_a$ and 118$_b$ even though it would also be possible to have molded lenses of a material other than that of the parallelepiped-shaped substrate 118, as well as having lenses on only one of the sides 118$_a$ and 118$_b$. Both substrates are transparent and are penetrated by the optical paths, specifically through the main sides 18$_a$ and 18$_b$, and 118$_a$ and 118$_b$, respectively. Thus, the above embodiments may be implemented in the form of a multi-aperture imaging device, specifically with a one-line channel arrangement, each channel projecting beyond a partial field of view of a total field of view, and the partial fields of view partially overlapping. A structure comprising several such multi-aperture imaging devices for stereo, trio, quattro etc. structures for 3D image capturing is possible. The plurality of modules may be configured as a contiguous line. The contiguous line might utilize identical actuators and a shared beam-deflecting element. One or more reinforcing substrates that might possibly be present within the optical path may extend across the entire line, which may form a stereo, trio, quattro structure. Super-resolution methods may be employed, wherein several channels image the same partial image areas. The optical axes may also extend in a divergent manner even without any beam-deflecting device, so that fewer facets are involved on the beam-deflecting unit. Advantageously, the facets will then have one angular component only. The image sensor may consist of one part, comprise only one contiguous pixel matrix or several interrupted ones. The image sensor may be composed of many sub-sensors which are adjacently arranged on a circuit board, for example. An autofocus drive may be configured such that the beam-deflecting element is moved synchronously with the optics or is idle.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-aperture imaging device comprising:
a one-line array of adjacently arranged optical channels, each channel comprising an optic;
wherein lenses of the optics of the optical channels are held within openings of one or more lens holders and the one or more lens holders are attached to a substrate of the array so that the lenses are mechanically connected via the substrate and that lens vertices of the lenses are spaced apart from the substrate, the substrate being configured to be transparent, and optical paths of the plurality of optical channels passing through the substrate;
wherein the multi-aperture imaging device comprises a beam-deflecting device for deflecting an optical path of the optical channels; wherein the beam-deflecting device is a mirror array reflecting on both sides, and is configured to capture the total field in opposing directions relative to the device by rotation; or
wherein the optics of the optical channels also comprise further lenses that are molded on a further main side of the substrate, which is located opposite the main side of the substrate.

2. The multi-aperture imaging device according to claim 1, wherein the lenses are held in a constant relative location with respect to each other via the substrate.

3. The multi-aperture imaging device according to claim 1, wherein the substrate is configured to be plate-shaped.

4. The multi-aperture imaging device according to claim 1, wherein the substrate comprises a glass plate.

5. The multi-aperture imaging device according to claim 1, wherein the one or more lens holders are mounted on the main side of the substrate.

6. The multi-aperture imaging device according to claim 1, further comprising a changing element that is configured to change, with angle adjustments of the beam-deflecting device, the total field of view, which is defined by the total coverage of the partial fields of view, in terms of its direction.

7. The multi-aperture imaging device according to claim 1, wherein the further lenses are molded, in multi-use, on the further main side of the substrate, which is located opposite the main side of the substrate, whereas the attachment of the lenses of the optics of the optical channels to the main side of the substrate is individually accomplished by the one or more lens holders.

8. The multi-aperture imaging device according to claim 1, wherein the optics of the optical channels comprise further lenses, which are attached on a further main side of the substrate, which is located opposite the main side of the substrate, via further lens holders and are mechanically connected via the substrate.

9. The multi-aperture imaging device according to claim 1, wherein the main side faces or faces away from an image sensor of the multi-aperture imaging device.

10. The multi-aperture imaging device according to claim 1, wherein the lenses of the optics of the optical channels are formed of polymer.

11. The multi-aperture imaging device according to claim 1, wherein the lenses are individually injection-molded.

12. The multi-aperture imaging device according to claim 1, wherein the substrate is suspended in a line extension direction of the one-line array next to the substrate.

13. The multi-aperture imaging device according to claim 12, wherein the substrate is suspended via a moving element that is configured to move the substrate and therefore the optics along the line extension direction in a translational manner in order to, through the movement along the line extension direction, achieve an image stabilization along the line extension direction.

14. The multi-aperture imaging device according to claim 1, further comprising an actuator for translationally moving the substrate along a line extension direction of the one-line array.

15. The multi-aperture imaging device according to claim 14, wherein the actuator is controlled by an optical image stabilization controller of the multi-aperture imaging device.

16. The multi-aperture imaging device according to claim 15, further comprising a beam-deflecting device for deflecting an optical path of the optical channels and a further actuator for producing a rotational movement of the beam-deflecting device, wherein the further actuator is further controlled by the optical image stabilization controller of the multi-aperture imaging device such that the translational movement of the substrate causes image stabilization along a first image axis and such that the generation of the rotational movement of the beam-deflecting device causes image stabilization along a second image axis.

17. The multi-aperture imaging according to claim 1, also comprising a further actuator for translationally changing an image-side distance between the image sensor and the optics and/or between the image sensor and the beam-deflecting device along the optical paths of the plurality of optical channels.

18. The multi-aperture imaging device according to claim 17, wherein the further actuator is controlled by a focus controller of the multi-aperture imaging device.

19. Multi-aperture imaging device according to claim 1, wherein the main side and/or a further main side located opposite the main side of the substrate comprise(s) a diaphragm at positions where the substrate is penetrated by the optical paths of the plurality of optical channels.

20. The multi-aperture imaging device according to claim 1, wherein further lenses of the optics of the optical channels are mechanically connected via a further substrate, the substrate and the further substrate being connected in series one behind the other, and both of them being penetrated by the optical paths of the plurality of optical channels, wherein an optical channel that penetrates the substrate also penetrates the further substrate.

21. The multi-aperture imaging device according to claim 1, wherein the optic of an optical channel is configured for projecting a respective partial field of view of a total field of view of the multi-aperture imaging device on a respectively associated image sensor region of an image sensor.

22. The multi-aperture imaging according to claim 1, also comprising a further actuator for translationally changing an image-side distance between the image sensor of the beam-deflecting device along the optical paths of the plurality of optical channels.

* * * * *